June 13, 1944.  C. J. KOPP  2,351,217
CUTTING AND THREADING TOOL
Filed July 26, 1943  2 Sheets-Sheet 1
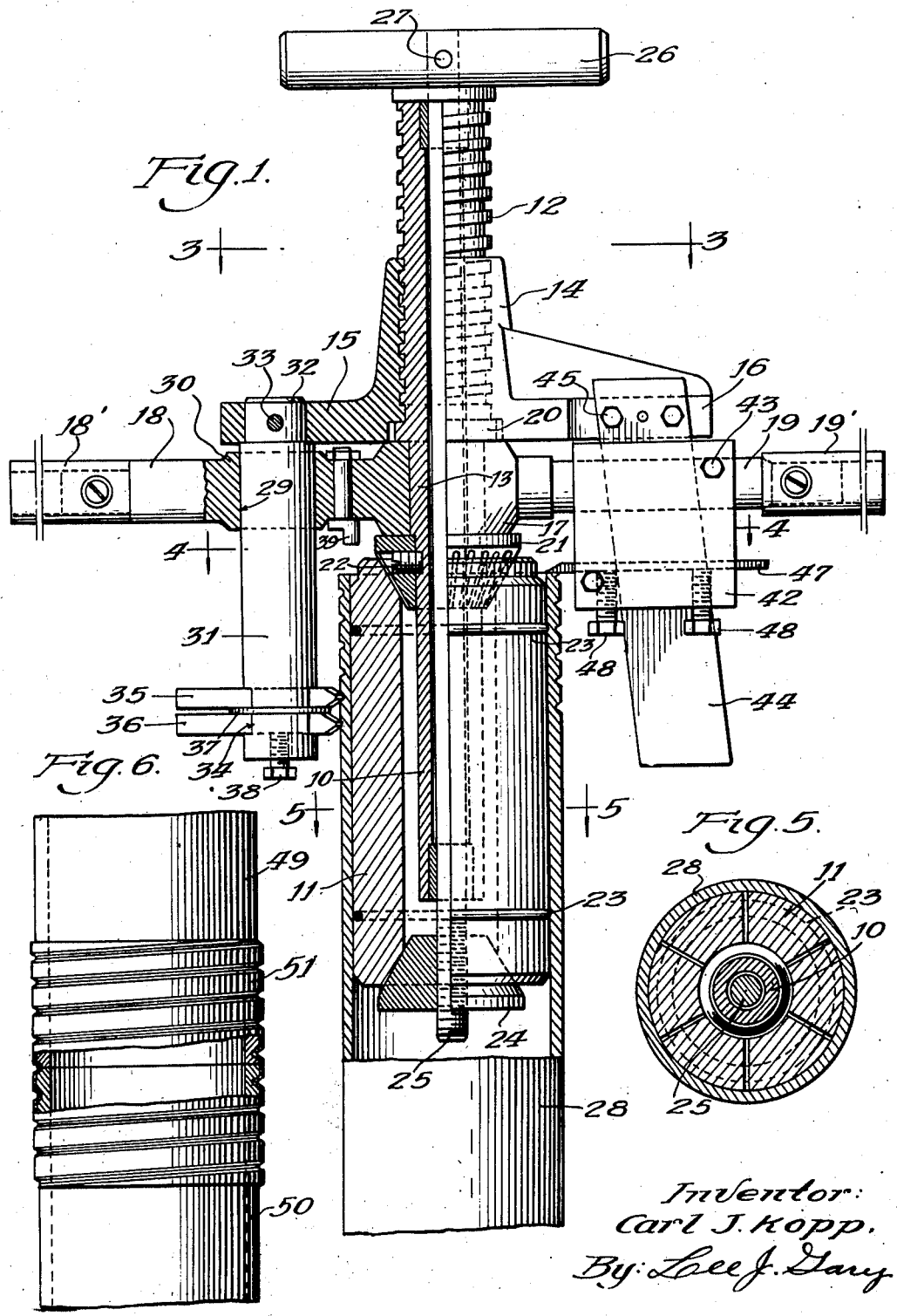

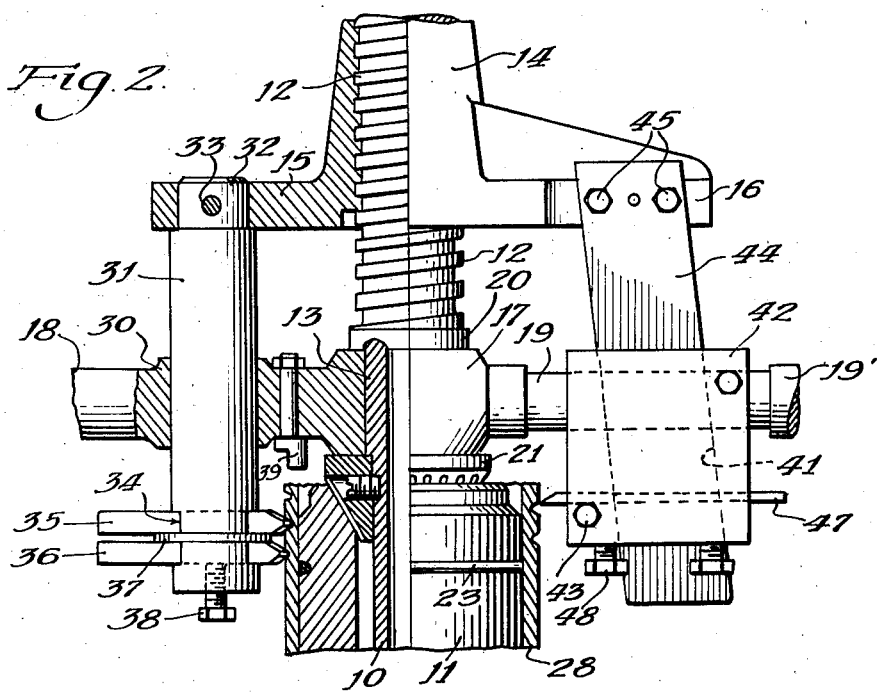
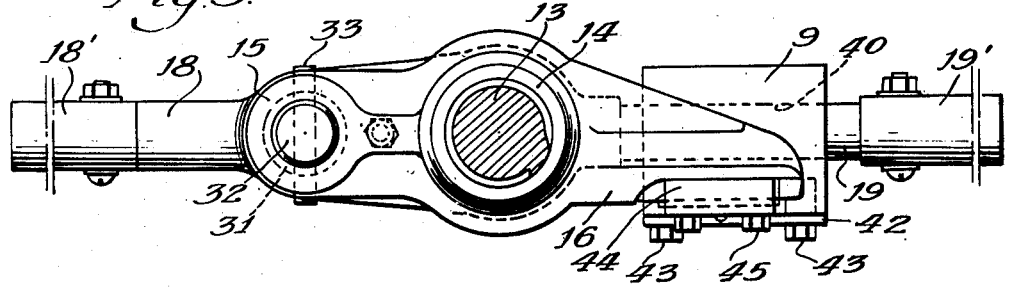
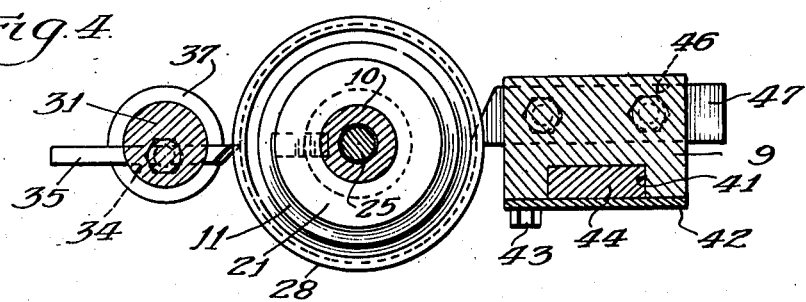

Patented June 13, 1944

2,351,217

UNITED STATES PATENT OFFICE 2,351,217

CUTTING AND THREADING TOOL

Carl J. Kopp, Chicago, Ill., assignor to Federal Electric Company, Inc., Chicago, Ill., a corporation of New York Application July 26, 1943, Serial No. 496,176

3 Claims. (Cl. 10—101)

This invention relates to a portable device adapted to simultaneously trim or cut and provide a thread on the end of tubes or conduits, particularly non-metallic tubing such as that formed of fibrous material and a binder.

Tubing composed of fibrous material and a binder such as the various natural and synthetic resins, whether of a thermoplastic or thermosetting nature has come to be employed for a multitude of purposes due to its relatively light weight, cheapness, and particular suitability for certain purposes, particularly temporary installations. One particular usage of such tubing is for shot-hole casing in seismographic oil exploration work where various lengths are connected together, portions destroyed during the operations, and the remainder desirably recovered for reuse. For such purpose it is desirable that sections of various length be coupled together or coupled to other necessary or existing metallic portions such as metallic tubing or drilling bits, and that salvaged or damaged portions be threaded or re-threaded and the ends trimmed to permit the formation of tightly coupled joints. Even with new tubing it is not always feasible to provide threaded sections in all necessary lengths, and of course for economical salvage or reuse the end trimming and threading must be performed in the field.

With the foregoing objects in view, the present invention provides a rugged yet portable tool adapted to provide a surface thread and an adjacent uniformly cut end on tubing of the class described in a single operation which can be quickly and conveniently performed and in an accurate manner on location.

Other objects relating to details of construction and arrangement of parts will be apparent from a consideration of the following specification end drawings, wherein:

Fig. 1 is a side elevation of the device of the present invention with an associated tube illustrating completion of the end trimming and thread formation operation thereon, parts being broken away and in section.

Fig. 2 is a fragmentary view similar to that of Fig. 1, but illustrating the commencement of the trimming and threading operation.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a side elevation of the end portions of two tubes which have been trimmed and threaded and joined together by a coupling sleeve.

Referring to the drawings, the reference numeral 10 indicates a shaft carrying an expansible mandrel 11 adjacent one end thereof, the opposed end of the shaft being formed with a thread 12 and the intermediate portion 13 of the shaft being smooth and cylindrical. The threaded shaft portion 12 carries the internally threaded hub member 14 having arms 15 and 16 extending radially therefrom. Mounted on the smooth shaft portion 13 is the smooth bore hub member 17 having operating arms 18 and 19, including tubular hand hold extensions 18' and 19' respectively, extending radially therefrom, the hub 17 being longitudinally confined between the collar 20 and the expander bushing 21 which is fixed to the shaft 10 by means of the set screw 22.

The mandrel 11, as illustrated in the section of Fig. 5, is composed of a plurality of segments, held together by means of a pair of split ring springs 23, and is supported on the shaft between the fixed bushing 21 and the travelling expander bushing 24 by means of the expander rod 25 which extends through the shaft 10. The expander rod 25 may be manipulated to expand and contract the mandrel by means of the handle 26 preferably fixed thereto by means of a pin 27. Thus a tube 28 to be cut and threaded may be slipped over the mandrel 11, when the segments thereof are permitted to contract under the action of its springs, and thereafter the handle 26 turned to cause the bushing 24 to be drawn to the bushing 21 and to expand the mandrel segments securely against the inner surface of the tube 28, after adjusting the tube in desired position longitudinally of the mandrel.

The operating arm 18 extending from the smooth bore hub 17, is formed with a bore 29 which extends parallel to the shaft 10, and is preferably formed in the thickened boss portion 30. An elongated tool holder 31 extends slidably through the aperture or bore 29, and is secured to the arm 15 of the threaded hub 14, by means of the shank portion 32 and the locking pin 33.

The outwardly projecting end portion of the tool holder 31 is provided with means for adjustably positioning one or more thread cutting tools, the preferred form of construction illustrating two adjacent tools, one for making a preliminary cut and the second for making the final cut of proper depth. Thus the terminal end portion of the tool holder 31 is formed with a transverse axially offset slot 34, as illustrated in the sectional view of Fig. 4, through which there is extended a pair of edged thread cutting tools 35 and 36, spaced by the washer 37. These tools are locked in position by the set screw 38, and may be additionally secured by means of added transversely extending set screws, not shown. The tools 35 and 36 are longitudinally spaced on the holder 31 the distance of a thread equivalent to that of the threads 12 of the threaded shaft portion, the illustrated threads being for example adapted to cut three threads per inch which has been found desirable for fibrous tubes of the class described. The cutting tool 35 may be suitably positioned by first extending it against the fixed gauge element 39 on the arm 18, and the tool 36 which makes a preliminary cut adjusted to project to a slightly lesser extent than the tool 35.

The operating arm 19 extending from the smooth bore hub 17, carries a radially slidable tool carriage comprising a block 9 having a bore 40 so as to enable it to slide longitudinally of the arm 19. The block 9 is formed with a groove 41 which extends across one face thereof and at an outwardly inclined angle, the groove being closed by the face plate 42 and screws 43 so as to provide a slot within which there is slidably extended the bar 44. The bar 44 is fixedly secured by the screws 45 to the radial arm 16 of the threaded hub 14, and as illustrated inclines downwardly and outwardly, the angle of incline being the same as that of the groove 41. The laterally projecting portion of the carriage block 9 is further formed with a transverse slot 46 for reception of the radially extending cutting tool 47, the tool being adjustably positioned by means of the screws 48.

In the operation of the device a tube to be trimmed and threaded is engaged over the mandrel 11 by manipulation of the handle 26 and placed initially in the position indicated in Fig. 2; that is, the end to be trimmed is positioned somewhat beyond the plane of the cutting tool 47, the device having been previously adjusted by relative rotation of the hubs 17 and 14 so as to cause them to be spaced a maximum distance from each other, and with the tool 47 spaced from the periphery of the engaged tube and the tools 35 and 36 spaced from the edge of the tube. The engaged tube may then be placed in a vice or otherwise suitably held, and the cutting mechanism actuated by rotation of the interengaged parts by means of the operating arm extensions 18' and 19', so as to cause movement of the hub 14 towards the hub 17. This causes progressive inward radial movement of the cutting tool 47 to provide an even, neatly trimmed edge, as indicated in Fig. 1, and simultaneously the thread cutting tools 35 and 36 progress longitudinally to form threads on the outer surface of the tube.

Fig. 6 illlustrates the manner in which the ends of two tubes threaded and trimmed by the device of the present invention may be coupled to provide a good joint. Here two tubes 49 and 50 are shown coupled in firm endwise abutment by means of a sleeve 51, this sleeve being suitably of relatively light metal provided with impressed threads of the same pitch as those provided on the tube. In a similar manner a metallic tube may be coupled to a fibrous tube or other necessary metallic parts such as a drilling bit may be coupled to a fibrous tube.

I claim as my invention:

1. A device of the class described comprising a shaft formed with a thread adjacent one end thereof and an intermediate adjacent smooth cylindrical portion, and cutting mechanism rotatably carried by both the threaded and smooth portions of the shaft, said mechanism comprising a smooth bore hub carried by the smooth shaft portion between longitudinal confining means thereon, radial operating arms projecting from said hub, one of said arms being formed with an aperture and the other carrying a radially slidable tool carriage including an end trimming cutting tool, a threaded hub carried by the threaded shaft portion having radial arms projecting therefrom, a tool holder carried by one of its arms parallel to said shaft and extending through said aperture including a thread cutting tool mounted on the projecting end portion thereof, and an outwardly inclined laterally extending slide member carried by the opposed arm and slidably engaged with said radially slidable tool carriage whereby actuation of the cutting mechanism to cause movement of the threaded hub towards the longitudinally restricted hub will cause inward radial movement of said slidable carriage.

2. A device of the class described comprising a shaft, expansible mandrel means carried by said shaft adjacent one end thereof, actuating means extending through said shaft to expand and contract the mandrel, said shaft being formed with a thread adjacent the opposed end thereof and an intermediate smooth cylindrical portion, and interengaged cutting mechanism rotatably carried by both the threaded and smooth portions of the shaft, said mechanism comprising a smooth bore hub carried by the smooth shaft portion between longitudinal confining means thereon, radial operating arms projecting from said hub, one of said arms being formed with an aperture and a radially slidable tool carriage carried by the other arm, a trimming tool mounted on said slidable carriage, a threaded hub carried by the threaded shaft portion, radial arms projecting from the threaded hub, a laterally extending elongated tool holder carried by one of its arms and extending through the aperture in said operating arm, a thread cutting tool carried by the projecting end of said elongated tool holder, and an inclined laterally extending member carried by the opposed arm of said threaded hub and slidably engaged with said radially slidable tool carriage whereby actuation of the cutting mechanism to cause movement of the threaded hub towards the longitudinally restricted hub will cause inward radial movement of said slidable carriage.

3. A device of the class described comprising a shaft, expansible mandrel means carried by said shaft adjacent one end thereof adapted to position a tubular article to be worked on, said shaft being formed with a thread adjacent the opposed end thereof and an intermediate smooth cylindrical portion, and interengaged cutting mechanism rotatably carried by both the threaded and smooth portions of the shaft, said mechanism comprising a smooth bore hub carried by the smooth shaft portion between longitudinal confining means thereof, radial operating arms projecting from said hub, one of said arms being formed with an aperture and a radially slidable tool carriage carried by the other arm, a radially extending edge cutting tool mounted on said slidable carriage, a threaded hub carried by the threaded shaft portion, radial arms projecting from the threaded hub, an elongated tool holder carried by one of its arms and extending parallel to the shaft and through the aperture in said operating arm, at least one radially extending thread cutting tool carried by the projecting end of said elongated tool holder, and a laterally extending, outwardly inclined member carried by the opposed arm of said threaded hub and slidably engaged within a similarly inclined aperture formed in said radially slidable tool carriage whereby actuation of the cutting mechanism to cause movement of the threaded hub towards the longitudinally restricted hub will cause inward radial movement of said slidable carriage and thereby simultaneously cut an engaged tubular article perpendicular to its axis and form a thread on its surface adjacent to the aforesaid cut portion.

CARL J. KOPP.